United States Patent
Pachikov et al.

(10) Patent No.: US 10,706,696 B1
(45) Date of Patent: Jul. 7, 2020

(54) SECURITY SYSTEM WITH DISTRIBUTED SENSOR UNITS AND AUTONOMOUS CAMERA VEHICLE

(71) Applicant: Sunflower Labs Inc., San Carlos, CA (US)

(72) Inventors: Alexander S. Pachikov, San Carlos, CA (US); Christian Eheim, Fällanden (CH); Nicolas de Palezieux, Zurich (CH)

(73) Assignee: Sunflower Labs Inc., San Carlos, CA (US)

( * ) Notice: Subject to any disclaimer, the term of this patent is extended or adjusted under 35 U.S.C. 154(b) by 68 days.

(21) Appl. No.: 15/895,606

(22) Filed: Feb. 13, 2018

Related U.S. Application Data

(60) Provisional application No. 62/465,439, filed on Mar. 1, 2017.

(51) Int. Cl.
| | |
|---|---|
| *H04N 7/18* | (2006.01) |
| *G08B 13/196* | (2006.01) |
| *G05D 1/02* | (2020.01) |
| *A01M 31/00* | (2006.01) |
| *A01M 29/18* | (2011.01) |
| *B64C 39/02* | (2006.01) |

(52) U.S. Cl.
CPC ........... *G08B 13/196* (2013.01); *A01M 29/18* (2013.01); *A01M 31/002* (2013.01); *B64C 39/024* (2013.01); *G05D 1/0202* (2013.01); *G08B 13/1966* (2013.01); *H04N 7/185* (2013.01); *B64C 2201/127* (2013.01); *B64C 2201/141* (2013.01); *Y10S 901/01* (2013.01)

(58) Field of Classification Search
CPC ................ H04N 7/18; G01S 5/22; G01S 5/30
USPC .................................................. 348/142–159
See application file for complete search history.

(56) References Cited

U.S. PATENT DOCUMENTS

| | | | |
|---|---|---|---|
| 7,385,626 B2 * | 6/2008 | Aggarwal | G06K 9/00771 348/143 |
| 2017/0234966 A1 * | 8/2017 | Naguib | G01S 5/22 367/117 |

* cited by examiner

*Primary Examiner* — Eileen M Adams
(74) *Attorney, Agent, or Firm* — Muirhead and Saturnelli, LLC

(57) ABSTRACT

A security system for monitoring a property includes a plurality of sensor units disposed at different locations throughout the property, an autonomous vehicle that travels throughout the property and contains a camera, and a central station, in communication with the sensor units and the autonomous vehicle, that dispatches the autonomous vehicle to a location corresponding to an unknown object detected by at least some of the sensor units and determined by a processing module of the central station to be a potential intrusion, wherein the autonomous vehicle provides video data of the potential intrusion to the central station. The autonomous vehicle may be a flying vehicle. The autonomous vehicle may be dispatched to a vantage point that is clear of any obstacles and provides an unobstructed view of the location of the potential intruder. A user of the device may approve dispatching the autonomous vehicle.

25 Claims, 4 Drawing Sheets

SECURITY SYSTEM WITH DISTRIBUTED SENSOR UNITS AND AUTONOMOUS CAMERA VEHICLE

CROSS-REFERENCE TO RELATED APPLICATIONS

This application claims priority to U.S. Prov. App. No. 62/465,439, filed on Mar. 1, 2017, and entitled "SECURITY SYSTEM WITH DISTRIBUTED SENSOR UNITS AND AUTONOMOUS CAMERA VEHICLE", which is incorporated herein by reference.

TECHNICAL FIELD

This application is directed to the field of residential security systems, and more particularly to the field of residential security systems with distributed sensor units and property inspections using autonomous camera vehicle.

BACKGROUND OF THE INVENTION

In response to increased concerns about general and residential security, the market for home security systems is growing at an accelerated pace as an important part of two broader markets, namely, all electronic security systems, and home automation. According to industry statistics, the global market for electronic security systems is expected to grow to approximately $80 billion by 2020, while market size for home security systems is projected to increase by an average nine percent per year in 2015-2020 from less than $30 billion in 2015 to reach $47.5 billion in 2020. North America represents the largest part of the market for residential home security systems. Key players in the electronic security system products and services, measured by cumulative numbers of installed units in the United States, are ADT, Monitronics International, Vivint Inc., Tyco Integrated Security, and Vector Security Inc., with combined 9.5 million units installed, of which ADT is by far the largest vendor with over six million installed units.

Electronic security requirements and solutions for various types of dwellings, such as tower blocks, regular apartment blocks, condominiums, and private homes are noticeably different. Accordingly, residential security companies are offering a large spectrum of electronic security products, systems and services, ranging from basic alarms and panic buttons to video surveillance (CCTV) solutions. Differentiated assessments of market size for various residential security products must also take into account the existing demographics and property distribution by categories. Census data indicate roughly 76 million of free-standing, owner or renter occupied, single family homes in the US and almost 56 million of those are in lightly populated areas, outside of city centers and dense urban environments. Only 30% of such homes currently have any kind of a home security system, which illustrates a strong unsatisfied demand for home security systems in the US.

Notwithstanding significant progress in developing home security systems and services, current product offerings are inviting significant improvements. The core design of home security systems has not advanced in several decades. For example, magnetic entry sensors paired with a control unit connected to a landline represent the basic system design known since the early 1970s, and even with the use of wireless sensors and cellular connections, contemporary systems continue to utilize the same design and principles. Similarly, video surveillance has not changed dramatically since the invention of CCTV systems. The setup of a home surveillance system still requires expensive installation, extensive wiring and obtrusive mounting of cameras. Additionally, the cameras are predominantly mounted on the very houses that they are trying to protect, which results in less than optimal observation angles. Moreover, the experience using a typical home security system is cumbersome. Monitoring alerts, DVR systems and mobile applications provided with these systems are complex, fragmented and offer a subpar user experience.

Recent advances in the use of mobile solutions paired with smartphones, and rudimentary use of drones for inspection represents a promising opportunity for commercial and DIY (Do-It-Yourself) home security systems but remain scattered and only partially address the noted flaws in current market offerings.

Accordingly, it is desirable to create a home security system that benefits from advances in sensor technology, autonomous navigation capabilities, wireless mobile applications and cloud services.

SUMMARY OF THE INVENTION

According to the system described herein, a security system for monitoring a property includes a plurality of sensor units disposed at different locations throughout the property, an autonomous vehicle that travels throughout the property and contains a camera, and a central station, in communication with the sensor units and the autonomous vehicle, that dispatches the autonomous vehicle to a location corresponding to an unknown object detected by at least some of the sensor units and determined by a processing module of the central station to be a potential intrusion, wherein the autonomous vehicle provides video data of the potential intrusion to the central station. The autonomous vehicle may be a flying vehicle. The autonomous vehicle may be provided with an optimal flying path to the location corresponding to the potential intrusion, where the optimal flying path is based on a multidimensional (2D/3D) grid of the property with each cell of the grid describing whether a physical location corresponding to the cell is occupied or is accessible/visible as a free space. The autonomous vehicle may be dispatched to a vantage point that is clear of any obstacles and provides an unobstructed view of the location of the potential intruder. The optimal path may be from a start location to the vantage point that is optimized according to a shortest distance and/or a segment along which the location of the potential intruder is visible for a greatest amount of time. A viewing direction of the autonomous vehicle may be provided to ensure that the autonomous vehicle faces towards the location of the potential intruder when the location of the potential intruder is visible from the autonomous vehicle. Each of the sensor units may have a head portion that includes a processor module, a communications module, an array of motion sensors, an array of LED lights, and/or a solar panel. Adjacent ones of the motion sensors may be arranged at different vertical angles to capture and estimate heights of objects. Each of the sensor units may have a column portion that includes a sound capturing device, a sound producing device, a battery pack, and/or a vibration sensor. At least one of the sensor units may have a spike based mounting module for installing the sensor unit in soil. The vibration sensor may be mounted low above the spike based mounting module. At least one of the sensor units may have a mounting plate for attaching the sensor to a flat surface. The vibration sensor may be mounted above the mounting plate. At least one of the sensor units may have a collar mounting part. At least one of the sensor units may have a vertical plate and an L-shaped adaptor. The central station may communicate monitoring information to a device. The monitoring information may include the video data from the autonomous vehicle. A user of the device may approve dispatching the autonomous vehicle. The processing module of the central station may determine the potential intrusion to be an animal, a human, or a motorized vehicle. The central station may cause at least some of the sensors to activate the sound generating devices therein to provide ultrasound repellant in response to the intrusion being animal. The central station may upload the video data to a cloud service. The central station may upload additional data and explanations with the video data. An application on a device of a user may download and replay the video data from the cloud service. The sensor units may communicate wirelessly with the central station. Each of the sensor units may be battery powered, connected to other power sources, and/or solar powered. The motion sensors and the vibration sensor may be co-located.

The proposed system includes a network of sensor units that are installed on a property and are constantly monitoring the property within a security perimeter of each sensor unit; sensor units are wirelessly communicating with a central station, where the sensor units and the central station are jointly capable of detection and categorization of extraordinary situations and potential intruders on the property; upon detection, the central station may dispatch an autonomous vehicle carrying a camera along an optimal path to inspect an extraordinary situation, take videos from the corresponding location, and stream videos and other data to the central station, which may transfer the videos and other data as needed to a mobile application on a smartphone, computer or other device of a user (e.g., property owner, manager, resident, etc.) using a cloud service to store videos and other event data.

Unlike most existing home security solutions, the proposed system focuses on perimeter and property security rather than on conventional home invasion sensors.

Each sensor unit may include the following components, some of which may be optional:

Head module, which may contain, as follows:
  a processor module for local data processing of measurements captured by sensors;
  communications module for wireless data exchange with a central station;
  array of motion sensors.
The head module may optionally include a lighting component, such as an array of LED lights and, additionally, where feasible due to climate conditions and installation place, a solar panel on top of the head module for a clean power solution.
Column module, enclosing the following parts:
  vibration sensor(s) at the ground level;
  optional battery pack; alternatively, a sensor unit may be connected to other power sources, such as existing power lines for a previously installed lighting system working independently from the security system;
  optional microphone or other sound level measuring or sound capturing device;
  optional speaker or ultra sound generating device, for example, an ultra-sound repellent.
Mounting module, construction of which may depend on a surface or other object to which the sensor unit is attached; options may include, without limitation:
  ground installation spike for mounting a sensor unit in soil;
  mounting plate for installing a sensor unit on a concrete surface or a wooden deck;
  collar mounting part for attaching a sensor unit to a standing tree or a previously installed permanent post on a property;
  vertical plate that connects to the column module with an L-shaped adapter for mounting a sensor unit on walls and fences Total height of a sensor unit may allow motion sensors enclosed in the head module to distinguishing objects by relative heights of the objects within vertical sensitivity areas of the sensors. In one example, full height of an installed sensor unit above the surface measures about 18".

In an embodiment, an autonomous camera vehicle may be represented by a small custom-designed autonomous drone. Such a flying vehicle may normally fly in detected or pre-defined observations zones, as well as to and from a housing place of the flying vehicle. The flying vehicle may include some or all of the following components:
  Autonomous flight autopilot controller.
  Global Positioning System (GPS).
  Cameras optimized for low light.
  Laser, IR or sonar rangefinders for accurate distance and object mapping.
  Focused LED lights in visible and infrared spectrum to help illuminate target subject or area.
  RF link for video transmission
  Telemetry link for status and navigation information.

Another feature of the system may be an automatic planning of a path for the autonomous camera vehicle. Based on a multidimensional (2D/3D) grid of the property where each cell describes whether the physical location corresponding to the cell is occupied or is accessible/visible as a free space, and where the grid is referenced to a real-world location, a vantage point may be found, which allows for the best observation of a point of interest, at or around which point an extraordinary activity has been detected by sensor units, communicating with the central station, as explained elsewhere herein. The vantage point is defined as a point that is clear of any obstacles and provides an unobstructed view of the point of interest; the vantage point may satisfy other conditions beneficial for the system functioning, such as securing the viewing direction towards the center of the mapped environment. Accordingly, an optimal path may be planned from a start location (such as a default location within housing containing the vehicle) to the vantage point; optimization conditions may include, as non-limiting examples, a shortest distance and a maximization of a length or a moving time along a segment of the path from which a point of interest is visible, with an additional condition that the viewing direction ensures that the autonomous vehicle always faces towards the point of interest when the point of interest is visible.

A central station may contain a main processing unit responsible for data processing and may contain a communication unit, which maintains connections with the sensor units, the autonomous camera vehicle, a cloud service used to store system data, including video feeds from the vehicle, mobile applications, including mobile applications for smartphone based visualization, control and system management software for users (e.g., property owner(s), manager(s), resident(s), etc.), and many other connections and system management functions, such as telemetry, RX/TX, power and charge management for sensor units, landing assistance in case the autonomous camera vehicle is a flying vehicle, video RX from the vehicle, etc. The central station may simultaneously support multiple communications protocols and methods, such as a dedicated RF connection with sensor units and the autonomous camera vehicle and Wi-Fi or LAN connections with home automation system and smartphones, computers or other devices of users(s) that are present on the property and within the access range of residential Wi-Fi networks. The central station may also support cellular connection(s) to device(s) of users(s) that may not be in range of Wi-Fi, LAN, or similar connections.

System Functioning May be Described as Follows:
1. After installation, configuration and initialization, sensor units constantly monitor a security perimeter of a property.
2. Sensor units (and/or the central station) are supplied with geometrical, vibration and motion profiles of various objects that may appear within the security perimeter, such as domestic and wild animals, humans, motor vehicles outside the property that are passing by, approaching or stopping by the property, etc.
3. Once one or multiple sensor units detect any unusual activity, the sensors may coordinate with the central station to process monitoring the unusual activity until the activity is either dismissed or results in identifying an extraordinary activity with potentially threatening consequences, such as a potential intrusion. Object profiles (explained above) may be used to categorize potential intruders, for example, to distinguish animals from humans or to categorize motor vehicles by types. Additionally, combinations of profiles and identified activities may be employed for exploring more complex behaviors, such as a car that has been approaching the property and subsequently stops nearby or an individual approaching the house.
4. When an extraordinary activity has been identified, the system may dispatch the autonomous camera vehicle to inspect the activity and the potential intruder on the spot. Depending on chosen options, such inspection decision may be fully automatic, semi-automatic (for example, proposed by AI logic of the central station but requiring approval of the user (e.g., property owner, manager, resident, etc.) within the mobile application) or fully manual, determined by the user according to the information provided by the security monitoring application on a device of the user.
5. The autonomous camera vehicle may record the video for a predetermined or a dynamically determined period of time and send the video feed to the central station, which may store the video in the cloud service and provide streaming of the video to a mobile application of the user; replay capabilities for past events may also be available in the mobile application.
6. Subsequent actions of the system may include automatic actions, such as switching on embedded animal repellents in sensor units, arrival of the user to a place of extraordinary activity, canceling an extraordinary event based on user or system judgment, contacting authorities, etc.

BRIEF DESCRIPTION OF THE DRAWINGS

Embodiments of the system described herein will now be explained in more detail in accordance with the figures of the drawings, which are briefly described as follows.

DETAILED DESCRIPTION OF VARIOUS EMBODIMENTS

The system described herein provides a mechanism and process for monitoring residential security using installed sensor units, detecting and assessing extraordinary events such as potential intrusions, inspecting property using an autonomous camera vehicle, supplying users (e.g., property owner(s), manager(s), resident(s), etc.) of a property being monitored with video feeds and other information on potentially threatening situations on mobile and/or other devices of the user, supporting decisions of the user on various aspects of residential security and making automated decisions within a permitted scope.

Figure 1A:
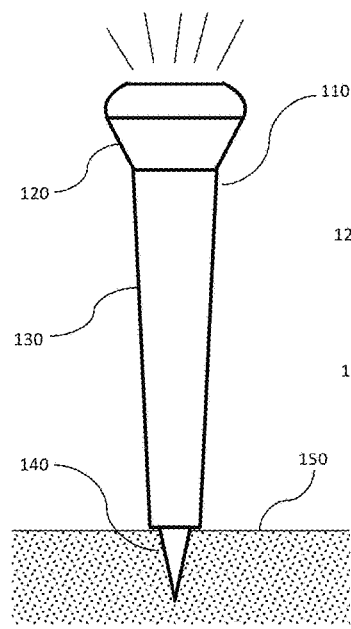
FIGS. 1A-1D are schematic illustrations of assembly and mounting of a sensor unit, according to an embodiment of the system described herein.
Figure 1B:
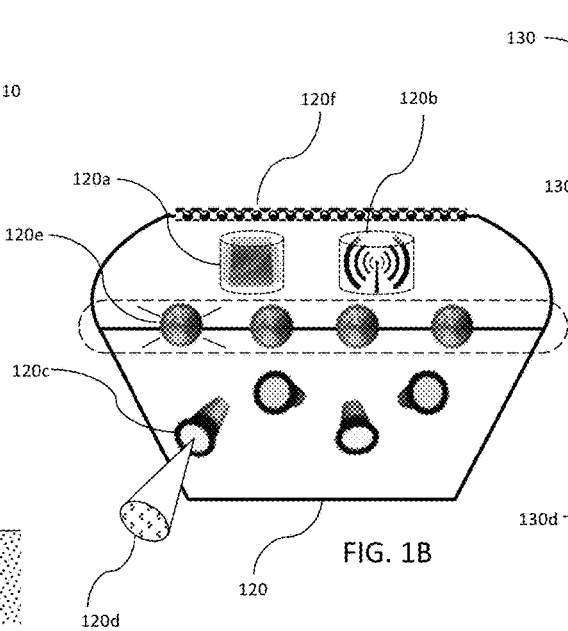
Figure 1C:
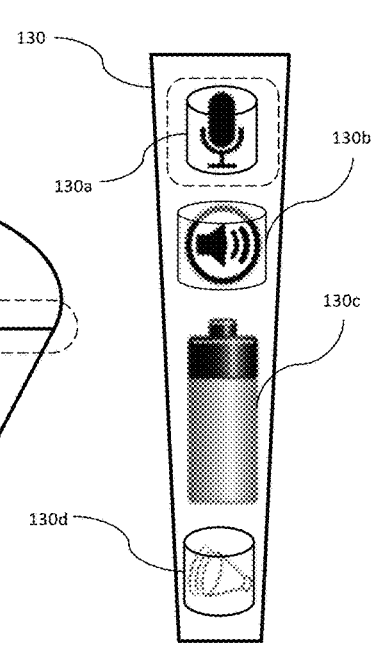
Figure 1D:
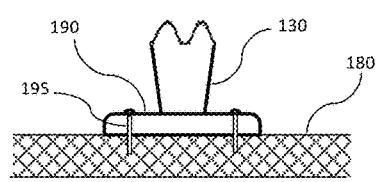

FIGS. 1A-1D are schematic illustrations of assembly and mounting of a sensor unit. An assembled sensor unit 110 may include three parts: a head module 120, a column module 130 and a mounting module 140 (here shown as a ground installation spike for mounting a sensor unit in soil 150; an alternative option is also shown in FIG. 1D, as explained elsewhere herein).

The head module 120 may contain the following parts, some of which may be optional: a processor module 120*a* for local data processing of measurements captured by sensors, for forming event data transmitted to a central station and for interpreting instructions and data requests from a central station; a communications module 120*b* for wireless data exchange with a central station; an (optional) array of motion sensors 120*c* where adjacent motion sensors may be arranged at different vertical angles (turned slightly down/up against the horizontal surface) so that their overlapping and densely situated motion capturing zones 120*d* would be able to capture and measure increased object heights; an (optional) array of LED lights 120*e*; and, where feasible due to climate conditions and installation place, an (optional) solar panel 120*f* on top of the head module. All parts may be assembled within a body of the head module 120.

The column module 130 contains an optional microphone or other sound capturing device 130*a*, an optional speaker, ultra sound generator or sound producing device 130*b*, an optional battery pack 130*c* (alternative power supply options are explained elsewhere herein), a vibration sensor 130*d*; all parts may be assembled within a body of the column module 130.

The spike based mounting module 140 for installing the sensor unit 110 in the soil 150 may be altered for mounting on a solid surface 180, such as a concrete surface or a wooden deck. In FIG. 1D, a base of the column module 130 may be attached to a mounting plate 190, which may be fastened to the solid surface 180 using bolts 195. In some embodiments, the motion sensors 120*c* and the vibration sensor 130*d* may be co-located or may be in different modules as shown in FIGS. 1A-1D. The vibration sensor 130*d* may be mounted low above the spike based mounting module 140 in the soil 150 or mounted right above the mounting plate 190 on concrete or stone paths and driveways (hard ground). The vibration sensor 130*d* may be a single-axis sensor or a multi-axis sensor.

Figure 2:
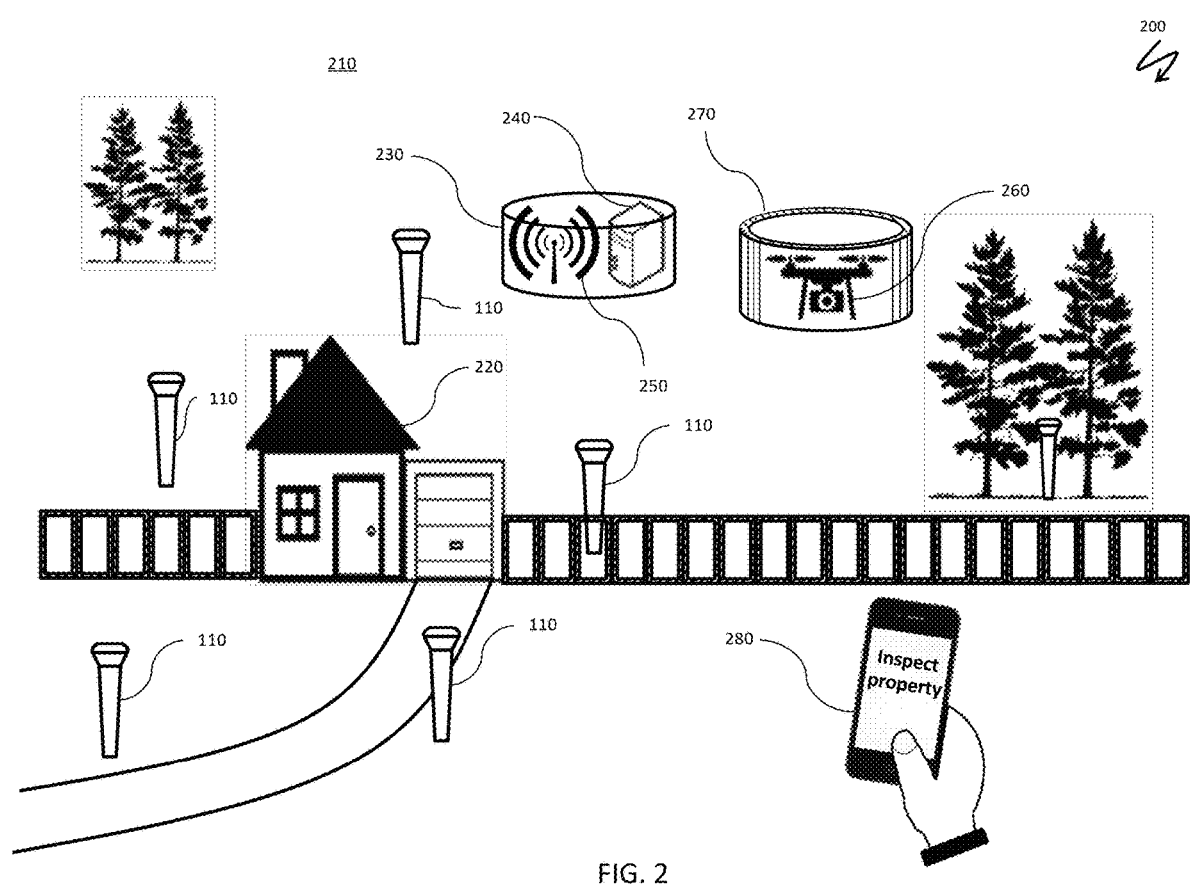
FIG. 2 is a schematic illustration of a fully installed system, according to an embodiment of the system described herein.

FIG. 2 is a schematic illustration 200 of a fully installed system. The system is installed on a property 210 having a house 220 and includes a plurality of the sensor units 110 distributed across the property 210; a central station 230 with a processing module 240 and a communications module 250; an autonomous camera vehicle 260—in FIG. 2, a flying vehicle 260 shown in a housing 270 for the vehicle 260; and a mobile device 280 of a user (e.g., property owner, manager, resident, etc.) where a mobile residential security and property inspection application may be running.

Figure 3:
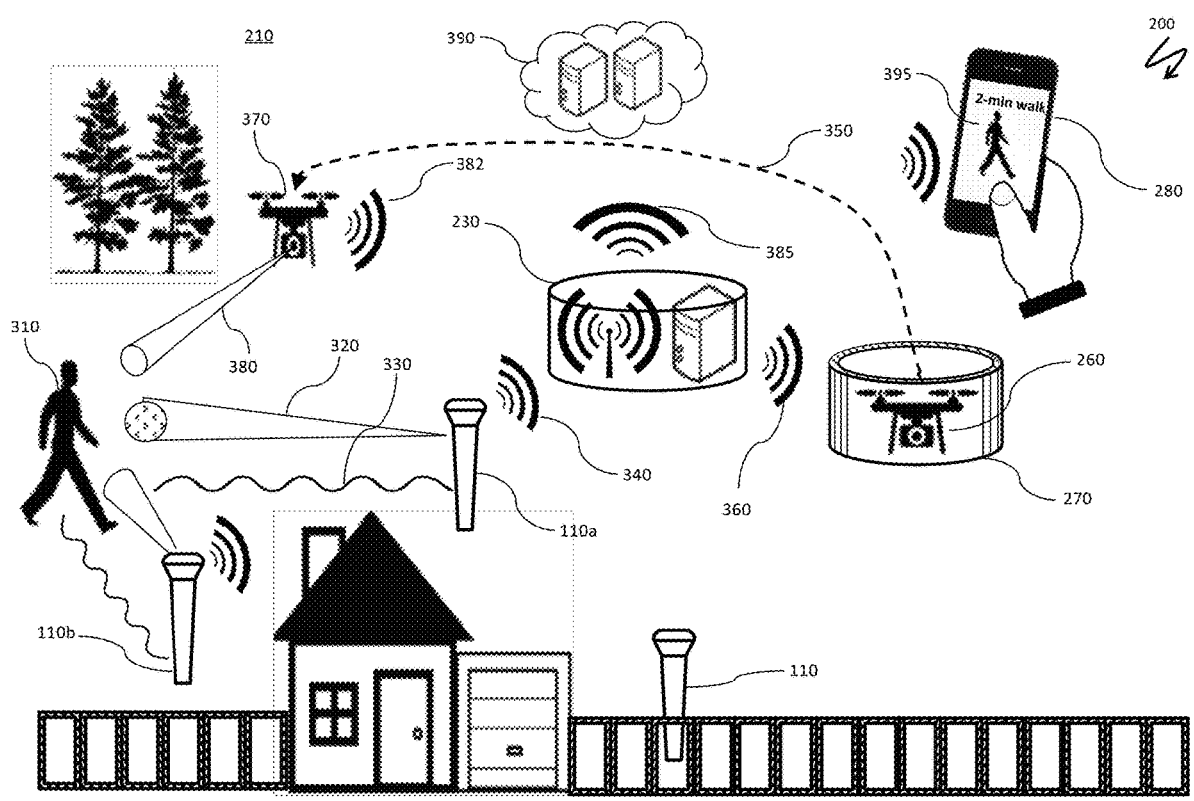
FIG. 3 is a schematic illustration of detection, assessment and actions in case of a potential intrusion, according to an embodiment of the system described herein.

FIG. 3 is a schematic illustration 300 of detection, assessment and actions in case of a potential intrusion. Two adjacent ones 110*a*, 110*b* of the sensor units 110 installed on the property 210, detect an unknown object 310 using motion sensing capabilities 320 and vibration sensing capabilities 330 of the sensor units 110*a*, 110*b*. Data on the unknown object 310 is dynamically transmitted to the central station 230, as shown by a wireless signal 340. Upon further analysis of the data from the sensor units 110*a*, 110*b*, it has been determined that the unknown object 310 may be an intruder. Accordingly, a situational analysis subsystem of the central station 230 decides to dispatch an autonomous camera vehicle (in this case, the flying vehicle 260, initially located in the housing 270) to inspect the object 310. An optimal flying path 350 for the vehicle 260 may be calculated and the central station 230 may communicate the inspection task and the flying path to the vehicle 260, as illustrated by a wireless signal 360.

The autonomous flying vehicle 260 moves along the optimal path 350 to a vantage point 370 and records live videos of the unknown object 310, as shown by a capturing illustration 380; videos are communicated back to the central station 230 via a wireless signal 382. The central station 230 may further process the videos and upload the videos to a cloud service 390 (via a wireless signal 385) in a format and with additional data and explanations that may be immediately streamed by the cloud service 390 or the central station 230 to a mobile application 395 running on a mobile device 280 of the user. The application 395 may replay recently captured and previous videos, display various characteristics of the situation, propose a course of actions to the user, accept and translate instructions of the user, etc.

Figure 4:
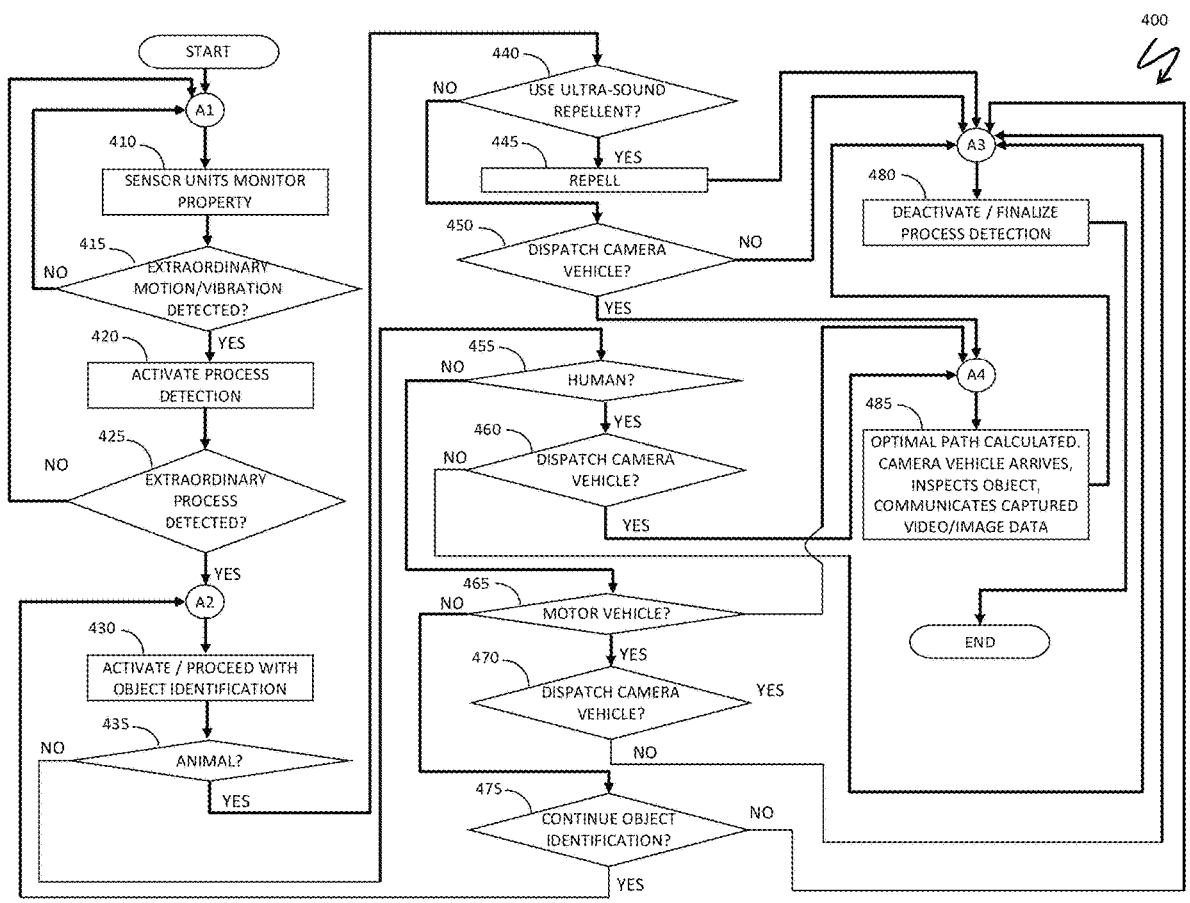
FIG. 4 is a system flow diagram illustrating system functioning, according to an embodiment of the system described herein.

Referring to FIG. 4, a system flow diagram 400 illustrates processing in connection with monitoring and inspecting a property, processing and communicating and transmitting relevant data. Processing begins at a step 410, where sensor units are continuously monitoring a property. After the step 410, processing proceeds to a test step 415, where it is determined whether and extraordinary movement or vibration has been detected by one or more of the sensor units. If not, processing proceeds back to the step 410; otherwise, processing proceeds to a step 420, where detection to identify a potential extraordinary object is activated, as explained elsewhere herein. After the step 420, processing proceeds to a test step 425, where it is determined whether an extraordinary object has been detected. If not, processing proceeds back to the step 410; otherwise, processing proceeds to a step 430, where object identification in conjunction with the detected extraordinary object is activated or continued. Note that identifying an extraordinary object may require communications and data exchange between sensor unit(s) and the central station (as explained, for example, in FIG. 3 and the accompanying text). After the step 430, processing proceeds to a test step 435, where it is determined whether the identified extraordinary object is an animal. If so, processing proceeds to a test step 440, where it is determined whether an ultra-sound repellent must be used. If so, processing proceeds to a step 445 where repelling is done. After the step 445, processing proceeds to a step 480, where the system deactivates and completes object detection (previously activated at the step 420). After the step 480, processing is complete.

If it is determined at the test step 440 that an ultra-sound repellent is not to be used, processing proceeds to a test step 450, where it is determined whether the system dispatches a camera vehicle for object inspection. If so, processing proceeds to a step 485, where an optimal path is calculated, as explained elsewhere herein (see, for example, FIG. 3 and the accompanying text). In addition, at the step 485 the camera vehicle is dispatched, arrives to the vantage point, inspects the previously identified object and communicates captured video and image data, as explained elsewhere herein. After the step 485, processing proceeds to the step 480, described above, which may be independently reached from the step 445. If it is determined at the test step 450 that the system does not dispatch a camera vehicle, processing proceeds to the step 480, which may be independently reached from the steps 445, 485.

If it is determined at the test step 435 that the object detected in conjunction with an extraordinary object is not an animal, processing proceeds to a test step 455, where it is determined whether the detected object is a human; if so, processing proceeds to test step 460, where it is determined whether the system dispatches a camera vehicle for object inspection. If so, processing proceeds to the step 485, described above, which may be independently reached from the step 450; otherwise, processing proceeds to the step 480, which may be independently reached from the steps 445, 450, 485.

If it is determined at the test step 455 that the detected object is not a human, processing proceeds to a test step 465, where it is determined whether the detected object is a motor vehicle; if so, processing proceeds to a test step 470, where it is determined whether the system dispatches the camera vehicle for object inspection. If so, processing proceeds to the step 485, which may be independently reached from the steps 450, 460; otherwise, processing proceeds to the step 480, which may be independently reached from the steps 445, 450, 460, 485.

If it is determined at the test step 465 that the detected object is not a motor vehicle, processing proceeds to a test step 475, where it is determined whether the system continues object identification. If so, processing proceeds back to the step 430, which can be independently reached from the test step 425, to continue object identification; otherwise, processing proceeds to the step 480, which may be independently reached from the steps 445, 450, 460, 470, 485.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, storage configurations and access permission mechanisms may vary from the illustrations presented herein. Further, various aspects of the system described herein may be implemented using software, hardware, a combination of software and hardware and/or other computer-implemented modules or devices having the described features and performing the described functions. Smartphones functioning as devices running mobile system application(s) for users may include software that is preloaded with the device, installed from an app store, installed from a desktop (after possibly being pre-loaded thereon), installed from media such as a CD, DVD, etc., and/or downloaded from a Web site. Such smartphones may use operating system(s) selected from the group consisting of: iOS, Android OS, Windows Phone OS, Blackberry OS and mobile versions of Linux OS.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The software may be bundled (pre-loaded), installed from an app store or downloaded from a location of a network operator. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A security system for monitoring a property, comprising:
    a plurality of sensor units disposed at separate fixed locations throughout the property, each of the sensors constantly monitoring the property within a security perimeter of each sensor unit; an autonomous vehicle that travels throughout the property and contains a camera;
    and a central station, in communication with the sensor units and the autonomous vehicle, that dispatches the autonomous vehicle to a location corresponding to an unknown object detected by at least some of the sensor units at separate fixed locations throughout the property and determined by a processing module of the central station to be a potential intrusion based on object profiles that include at least one of: domestic animals, wild animals, humans, and automobiles, wherein the autonomous vehicle provides video data of the potential intrusion to the central station.

2. The security system of claim 1, wherein the autonomous vehicle is a flying vehicle.

3. The security system of claim 2, wherein the autonomous vehicle is provided with an optimal flying path to the location corresponding to the potential intrusion, wherein the optimal flying path is based on a multidimensional (2D/3D) grid of the property with each cell of the grid describing whether a physical location corresponding to the cell is occupied or is accessible/visible as a free space.

4. The security system of claim 3, wherein the autonomous vehicle is dispatched to a vantage point that is clear of any obstacles and provides an unobstructed view of the location of the potential intruder.

5. The security system of claim 4, wherein the optimal path is from a start location to the vantage point that is optimized according to at least one of: a shortest distance or a segment along which the location of the potential intruder is visible for a greatest amount of time.

6. The security system, according to claim 5, wherein a viewing direction of the autonomous vehicle is provided to ensure that the autonomous vehicle faces towards the location of the potential intruder when the location of the potential intruder is visible from the autonomous vehicle.

7. The security system of claim 1, wherein each of the sensor units has a head portion that includes one or more of: a processor module, a communications module, an array of motion sensors, an array of LED lights, and a solar panel.

8. The security system of claim 7, wherein adjacent ones of the motion sensors are arranged at different vertical angles to capture and estimate heights of objects.

9. The security system of claim 1, wherein each of the sensor units has a column portion that includes one or more of: a sound capturing device, a sound producing device, a battery pack, and a vibration sensor.

10. The security system of claim 9, wherein at least one of the sensor units has a spike based mounting module for installing the sensor unit in soil.

11. The security system of claim 10, wherein the vibration sensor is mounted low above the spike based mounting module.

12. The security system of claim 9, wherein at least one of the sensor units has a mounting plate for attaching the sensor to a flat surface.

13. The security system of claim 12, wherein the vibration sensor is mounted above the mounting plate.

14. The security system of claim 9, wherein at least one of the sensor units has a collar mounting part.

15. The security system of claim 9, wherein at least one of the sensor units has a vertical plate and an L-shaped adaptor.

16. The security system of claim 1, wherein the central station communicates monitoring information to a device.

17. The security system of claim 16, wherein the monitoring information includes the video data from the autonomous vehicle.

18. The security system of claim 16, wherein a user of the device approves dispatching the autonomous vehicle.

19. The security system of claim 1, wherein
    the central station causes at least some of the sensors to activate the sound generating devices therein to provide ultrasound repellant in response to the intrusion being animal.

20. The security system of claim 1, wherein the central station uploads the video data to a cloud service.

21. The security system of claim 20, wherein the central station uploads additional data and explanations with the video data.

22. The security system of claim 20, wherein an application on a device of a user downloads and replays the video data from the cloud service.

23. The security system of claim 1, wherein the sensor units communicate wirelessly with the central station.

24. The security system of claim 1, wherein each of the sensor units is at least one of: battery powered, connected to other power sources, or solar powered.

25. The security system of claim 1, wherein the motion sensors and the vibration sensor are co-located.

* * * * *